United States Patent [19]
Wass

[11] Patent Number: 6,098,320
[45] Date of Patent: Aug. 8, 2000

[54] FRONT END LOADER ATTACHMENT INCLUDING FORKS AND GRAPPLE FOR DIGGING, DISLODGING AND LIFTING MATERIALS

[76] Inventor: Lloyd G. Wass, 1670 Blackhawk Cove, Eagan, Minn. 55122

[21] Appl. No.: 09/175,878

[22] Filed: Oct. 20, 1998

Related U.S. Application Data

[60] Provisional application No. 60/062,899, Oct. 20, 1997.

[51] Int. Cl.[7] ............................................. E02F 3/00
[52] U.S. Cl. ................................. 37/406; 414/724
[58] Field of Search .................. 37/302, 303, 403, 37/405, 406, 903, 466, 468; 414/724, 912, 729; 294/88, 104

[56] References Cited

U.S. PATENT DOCUMENTS

| | | | |
|---|---|---|---|
| 2,870,925 | 1/1959 | Bernad et al. | 414/724 |
| 3,595,416 | 7/1971 | Perrotti | 414/767 |
| 4,285,628 | 8/1981 | Jankowski | 414/739 |
| 4,327,509 | 5/1982 | Bean | 37/117.5 |
| 5,094,581 | 3/1992 | Lamb | 37/405 X |
| 5,515,625 | 5/1996 | Keigley | 37/405 |
| 5,564,885 | 10/1996 | Staben, Jr. | 414/724 |
| 5,957,650 | 9/1999 | Rollo | 414/724 |

*Primary Examiner*—Robert E. Pezzuto
*Attorney, Agent, or Firm*—John M. Vasuta

[57] ABSTRACT

A rock, stump and other debris digger has a plurality of tines for digging, dislodging, and lifting the rock, stump or other debris and a plurality of grapple forks pivotally affixed to the digger frame for grabbing the rock, stump or other debris by pivoting the forks until the rock or debris is pinned therebetween so as to be secured for lifting, moving and/or positioning. The rock digger is attachable to a front end loader, skid steer loader or similar vehicle for use in farming, landscaping, construction, road maintenance, and demolition situations.

20 Claims, 13 Drawing Sheets

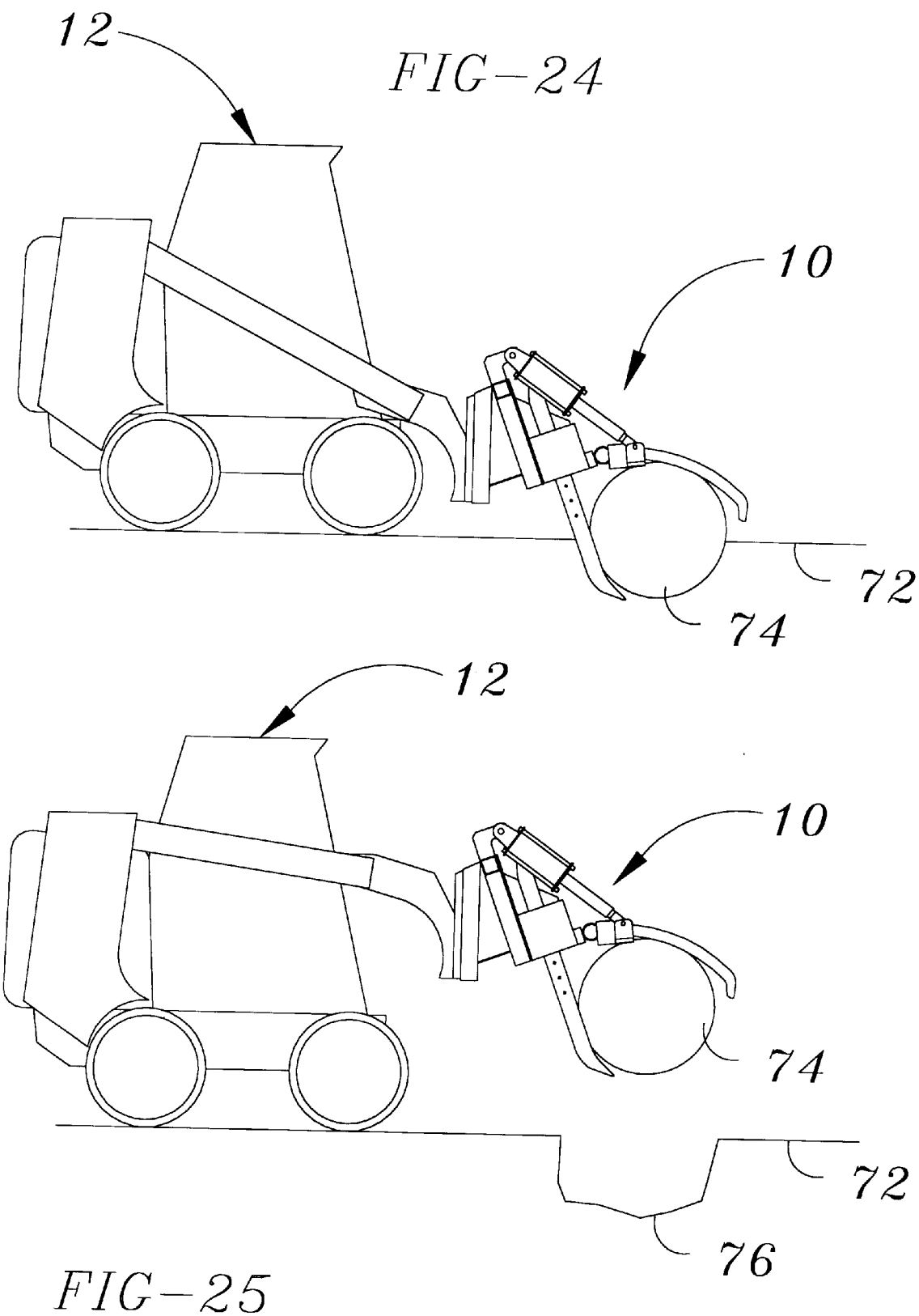

FRONT END LOADER ATTACHMENT INCLUDING FORKS AND GRAPPLE FOR DIGGING, DISLODGING AND LIFTING MATERIALS

This application is a continuation in part of provisional application serial No. 60/062,899, filed Oct. 20, 1997.

BACKGROUND OF THE INVENTION

1. Technical Field

The present invention relates to attachments for skid steer or other front end loaders. More particularly, the present invention relates to a device for digging, dislodging and/or moving rocks, stumps, and other similar large and bulky debris found in fields, yards, etc. Specifically, the present invention is a rock and other debris digger with a plurality of tines for digging, dislodging, and/or lifting the rock or other debris and a plurality of grapple forks pivotally affixed to the digger frame for grabbing the rock or other debris by pivoting the forks until the rock or debris is pinned therebetween so as to be secured for lifting and moving.

2. Background Information

For thousands of years, farmers have cleared land for farming. Often the fields to be farmed includes rocks, tree stumps, and other debris. These rocks and stumps make farming difficult because the rocks and stumps must either be avoided or else damage to the farm equipment such as plows often results.

For this reason, farmers have sought to remove these rocks and stumps using any available equipment including manually digging with shovels or more recently using backhoes and other construction equipment. However, backhoes and other construction equipment are expensive to own or rent, and often are not readily available. In addition, this equipment is difficult to transport into and use in the fields.

However, the rocks are often large enough that without such heavy duty equipment, the rocks and debris are difficult, if not impossible, to remove. Even today with the use of tractors and other farm equipment readily available on the farm, farm, it is often difficult and time consuming to dig out, dislodge and then lift out many of the rocks encountered in the fields since the larger rocks may be one to several feet in diameter and weigh several hundred pounds or more. Also, farm equipment is not designed for such work and is thus often inadequate to dislodge rocks that are substantially buried.

Other machinery exists as indicated above that will assist in such removal such as construction equipment including backhoes. However, all of the presently available equipment is large, bulky and otherwise not easy to transport and use in the remote fields. As is well known in the art, backhoes require trailers for transport and are not readily available on farms.

Recently, smaller construction vehicles often referred to as skid steer loaders and front end loaders are becoming readily available on the farm. These small construction vehicles are multi-functional and are finding lots of uses on today's farms as buckets, augers, trenchers, mini-backhoes, concrete breakers, planers, saws, rollers, stump grinders, pelletized material movers, brooms, sweepers, log handlers, bundled material or loose intertwined material handlers (baled hay, bundled hay, loose straw and/or manure movers), landscape rakes, rock and debris rakes, box scrapers, tillers, and scarifiers to name a few.

These smaller construction vehicles are also becoming actively used by landscapers, construction contractors, and road crews, as well as farmers. However, in each of these applications the users still do not have a good attachment for removal of rocks, stumps, and other debris from the ground, particularly when such rocks, stumps, and debris are substantially buried in the ground as is typical. Similarly these users such as landscapers do not have a good attachment for the lofting and positioning of items such as landscaping rocks, etc.

The present status of the prior art for removal of rocks, stumps, and other debris which is embedded or substantially buried in the ground, is primarily backhoes which as stated above are not readily available in many areas such as farms, are expensive to own or rent, are often large and heavy equipment that may not be capable of traversing the necessary terrain to get to the digging site, and are not optimized to pick up and move any rock that it digs up. The present attachments for the skid steer loaders and front end loaders do not provide the ability to pierce the ground, loosen the soil around the rock, dig up the rock, dislodge the rock, reach under the rock and grab or otherwise secure the rock, lift the rock, and move the rock (or carefully position the rock such as in a landscaping environment). This ability is desired by farmers, landscapers, construction workers, road crews, and others but is yet unrealized by backhoes, skid steer loaders, front end loaders, etc.

OBJECTIVES AND SUMMARY OF THE INVENTION

It is an objective of the present invention to provide an improved device for digging up rocks, stumps, and other large and heavy debris.

It is a further objective of the present invention to provide an improved device for piercing the ground and digging up rocks, stumps, and other large and heavy debris.

It is a further objective of the present invention to provide an improved device for piercing the ground, loosening the soil around and then digging up rocks, stumps and other large and heavy debris.

It is a further objective of the present invention to provide an improved device for dislodging rocks, stumps, and other large and heavy debris from the ground, particularly rocks, stumps, and debris that are substantially buried in the ground.

It is a further objective of the present invention to provide an improved device for piercing the ground, and dislodging and digging up rocks, stumps, and other debris.

It is further an objective of the present invention to provide an improved device for lifting rocks, stumps, logs, posts, and other debris.

It is further an objective of the present invention to provide an improved device for grabbing a rock, stump, log, post, or other debris.

It is further an objective of the present invention to provide an improved device for lifting and moving a rock, stump, log, post, or other debris.

It is further an objective of the present invention to provide an improved device for carefully positioning landscaping materials such as rocks, boulders, timbers, etc.

It is further an objective of the present invention to provide an improved device for piercing a ground and then dislodging, digging up, grabbing, lifting and then moving a rock, stump or other debris. It is further an objective of the present invention to provide all of the above listed objectives in an attachment for a skid steer loader, front end loader or the like.

It is further an objective of the present invention to provide all of the above listed objectives in an attachment for use on any type of construction, farm, landscaping, demolition, road maintenance or other machinery that is capable of traversing the necessary terrain to get to the digging site.

Still other advantages and benefits of the invention will become apparent to those skilled in the art upon a reading and understanding of the following summary and detailed description.

Accordingly, the present invention satisfies these and other objectives. Specifically, the present invention relates to a rock digging, dislodging, grabbing, lifting and moving device as claimed in the attached claims.

BRIEF DESCRIPTION OF THE DRAWINGS

Preferred embodiment of the invention, illustrative of the best mode in which applicant has contemplated applying the principles, are set forth in the following description and is shown in the drawings and is particularly and distinctly pointed out and set forth in the appended claims.

FIG. 24 is a side elevational view of the attachment of FIGS. 1–19 attached to a front end loader where the attachment is in a down (ground piercing) and downwardly angled position with the grapple forks in a closed and rock grabbing position; and FIG. 25 is a side elevational view of the attachment of FIGS. 1–19 attached to a front end loader where the attachment is in an up and downwardly angled position with the grapple forks in a closed and rock grabbing position where the rock is lifted out of the ground and movable.

Similar numerals refer to similar parts throughout the drawings.

DESCRIPTION OF THE PREFERRED EMBODIMENT

Figure 1:
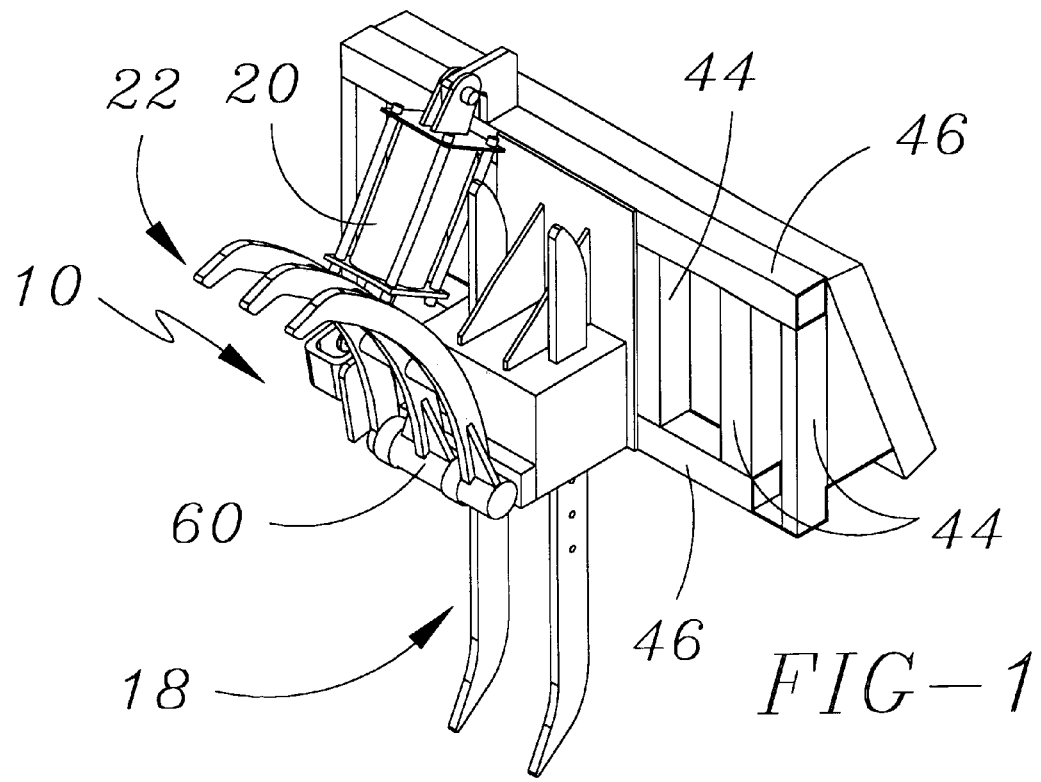
FIG. 1 is a general perspective view of the rock digging, dislodging, and lifting attachment of the present invention shown from a front-right-top perspective with the grapple forks open.
Figure 2:
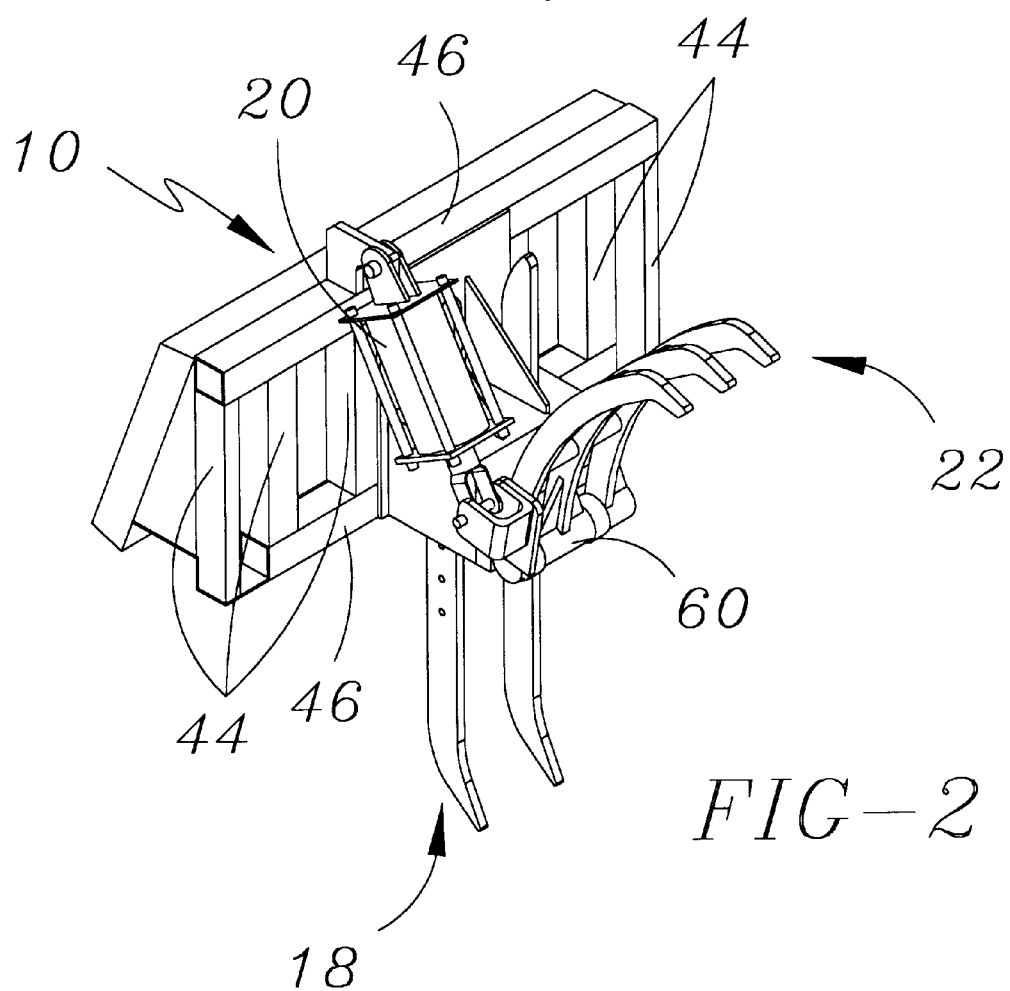
FIG. 2 is a general perspective view of the rock digging, dislodging, and lifting attachment of FIG. 1 shown from a front-left-top perspective with the grapple forks open.
Figure 3:
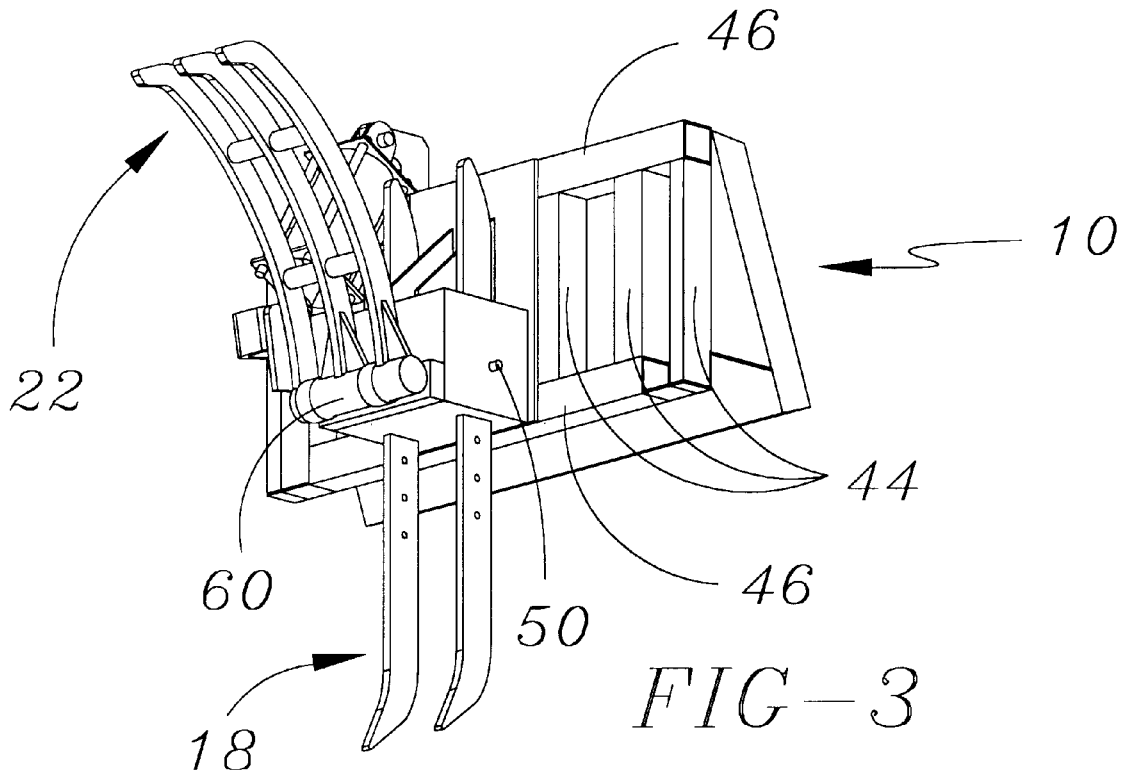
FIG. 3 is a general perspective view of the rock digging, dislodging, and lifting attachment of FIG. 1 shown from a front-right-bottom perspective with the grapple forks open.
Figure 4:
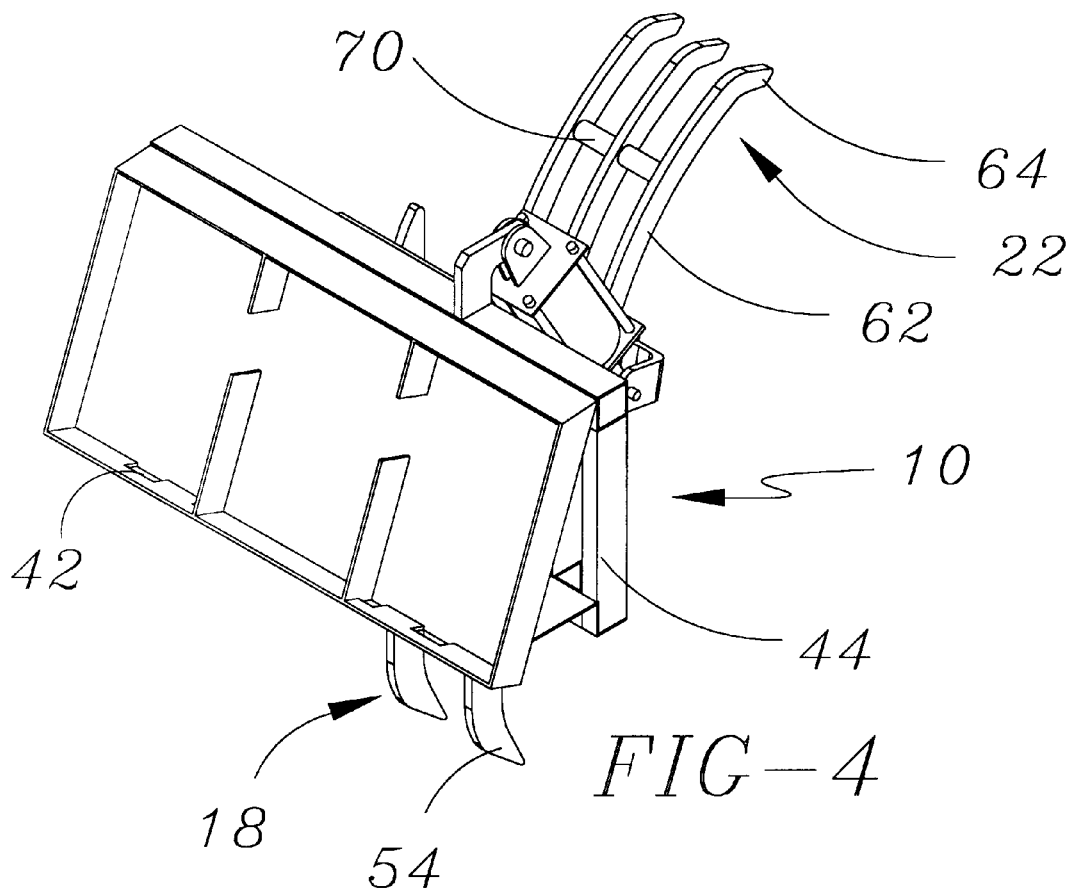
FIG. 4 is a general perspective view of the rock digging, dislodging, and lifting attachment of FIG. 1 shown from a back-left-top perspective with the grapple forks open.
Figure 5:
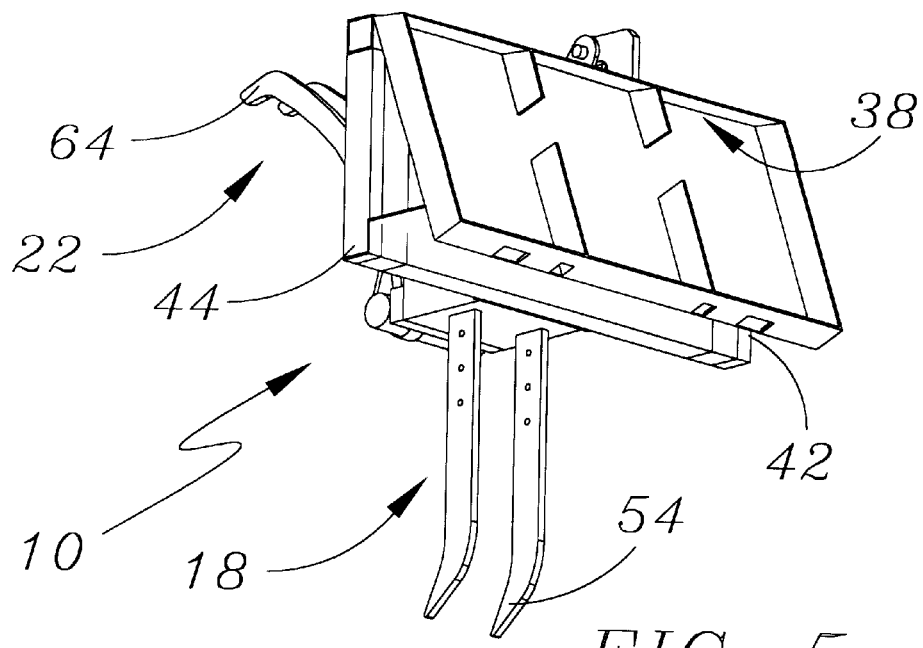
FIG. 5 is a general perspective view of the rock digging, dislodging, and lifting attachment of FIG. 1 shown from a back-right-bottom perspective with the grapple forks open.
Figure 6:
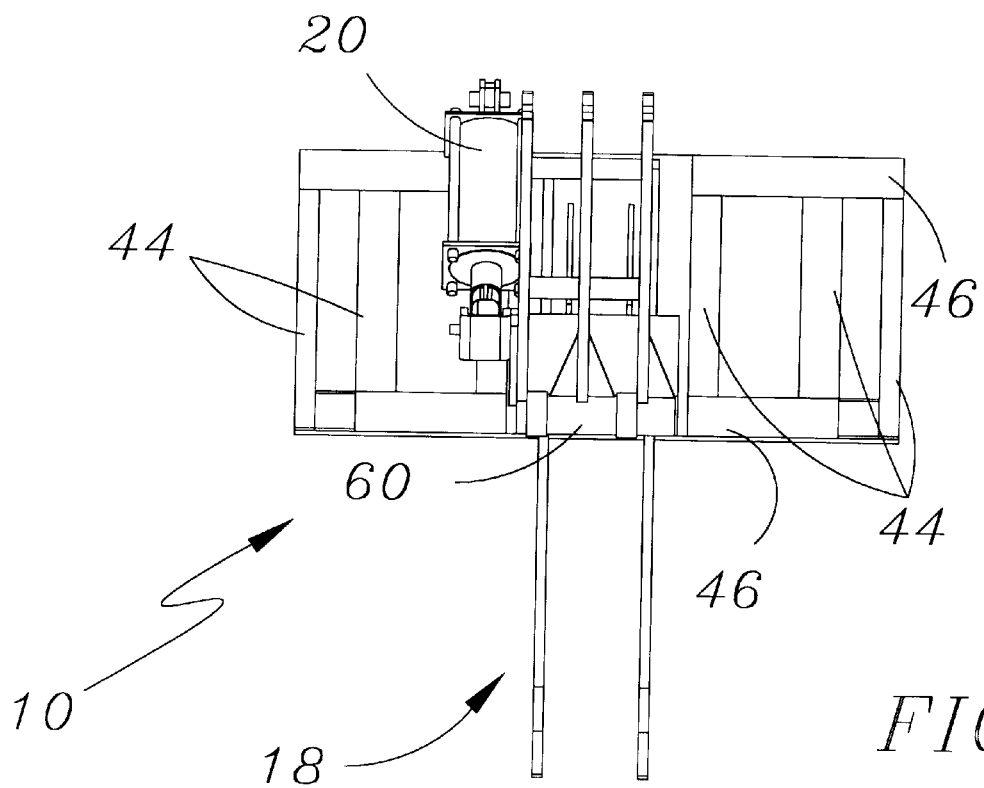
FIG. 6 is a front elevational view of the rock digging, dislodging, and lifting attachment of FIG. 1 with the grapple forks open.
Figure 7:
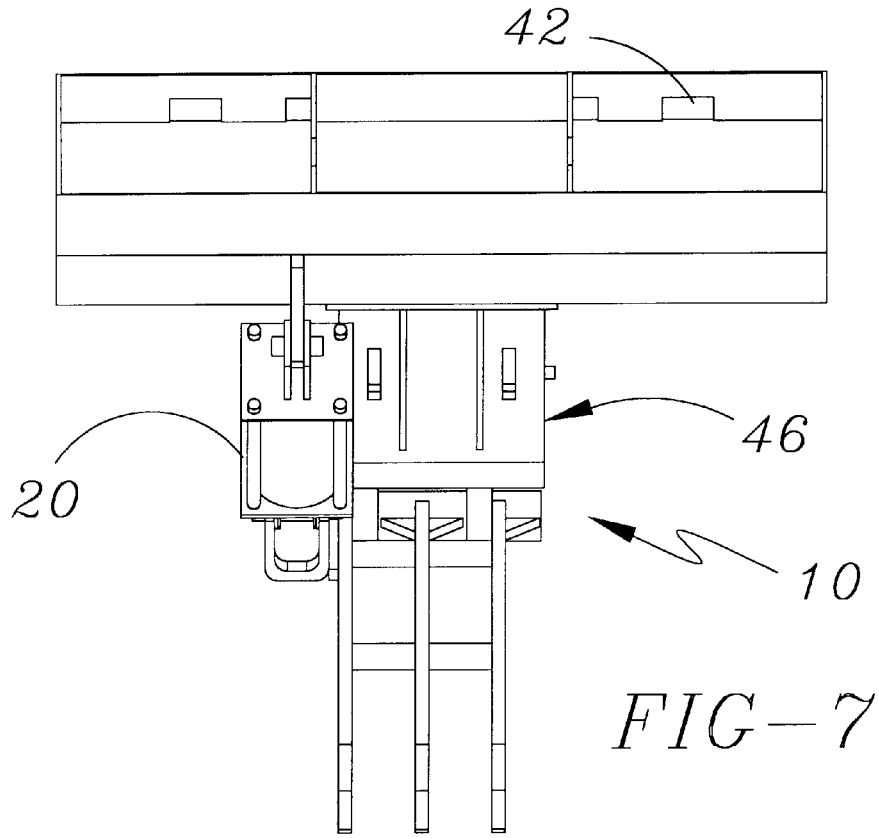
FIG. 7 is a top plan of the rock digging, dislodging, and lifting attachment of FIG. 1 with the grapple forks open.
Figure 8:
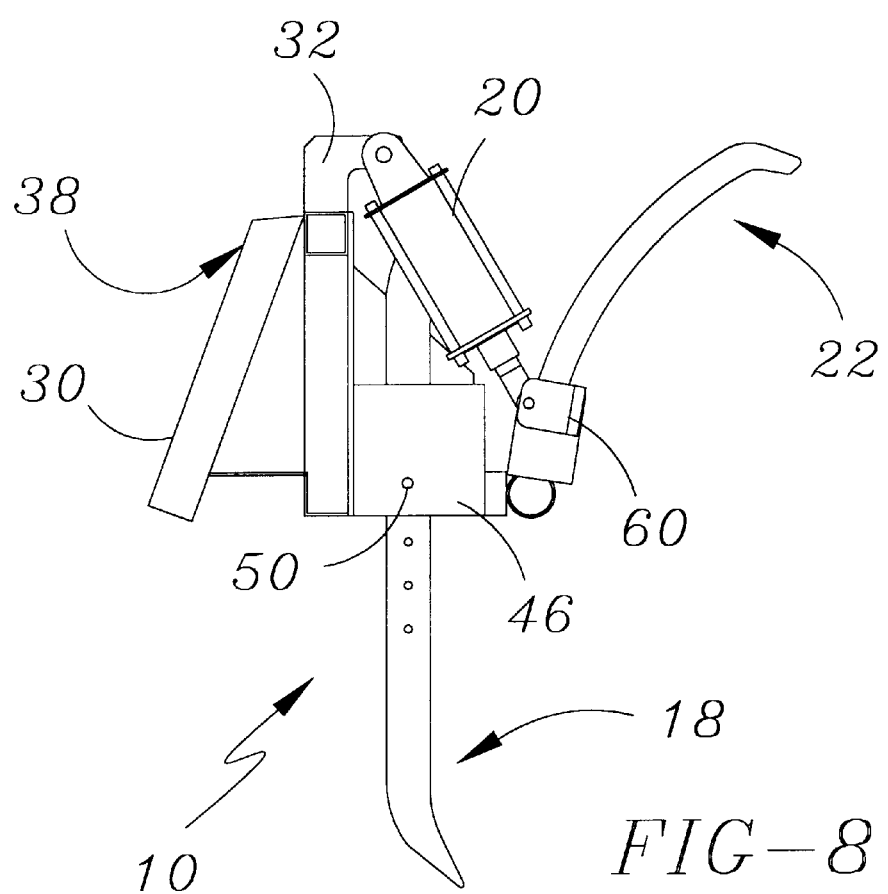
FIG. 8 is a left side elevational view of the rock digging, dislodging, and lifting attachment of FIG. 1 with the grapple forks open.
Figure 9:
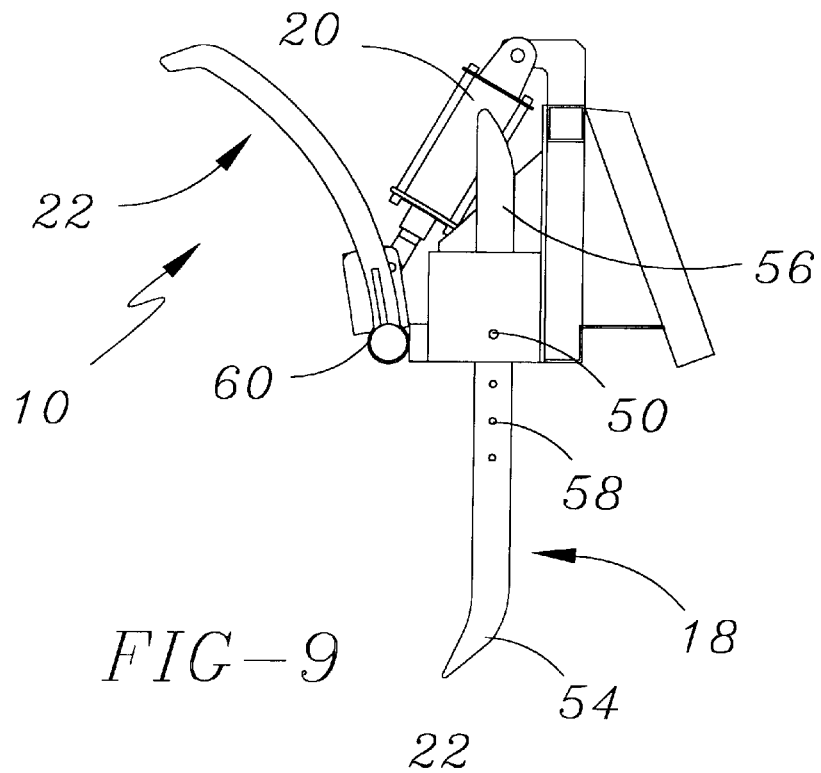
FIG. 9 is a right side elevational view of the rock digging, dislodging, and lifting attachment of FIG. 1 with the grapple forks open.
Figure 10:
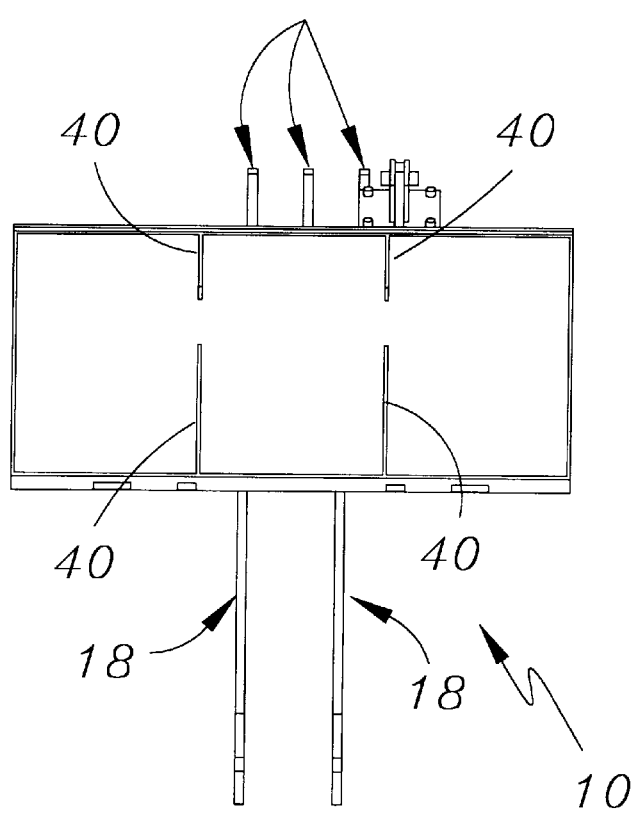
FIG. 10 is a back elevational view of the rock digging, dislodging, and lifting attachment of FIG. 1 with the grapple forks open.
Figure 11:
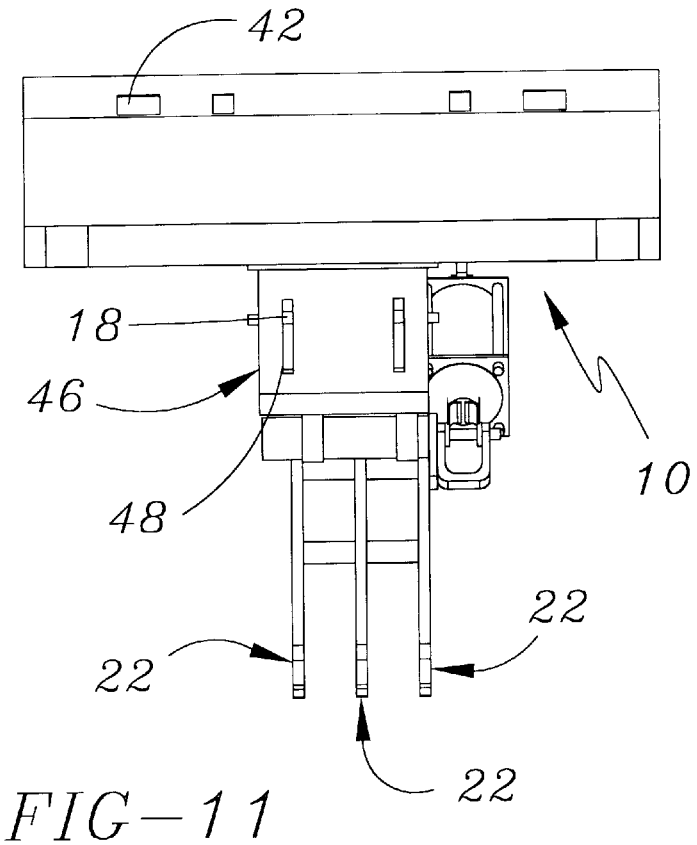
FIG. 11 is a bottom plan view of the rock digging, dislodging, and lifting attachment of FIG. 1 with the grapple forks open.

The present invention is a rock digging attachment for use with a front end loader (or skid steer loader or other similar construction, farming, demolition, road maintenance or landscaping tractor or machine). This rock digging attachment is indicated generally at 10 and is best shown overall in FIGS. 1–5 and shown attached to a front end loader 12 in FIGS. 20–25.

The rock digging attachment 10 as used with the front end loader 12 is a versatile attachment that pierces the ground, loosens the soil and digs around the rock (or other debris such as stumps, logs, etc. hereinafter generically referred to as rocks), dislodges the rock, grabs the rock, lifts the rock and/or moves or carefully positions the rock. The rock digging attachment 10 is more specifically a digging, dislodging, lifting and/or positioning attachment for rocks, stumps or other farm, construction, or landscaping debris of a heavy and bulky nature as the attachment can also be used on a vast variety of other heavy and bulky items found on the farm, at a construction or landscape job site, in road maintenance or demolition jobs, or otherwise such as stumps, small trees, poles, fence posts, fence sections, barrels, buckets, concrete or asphalt slabs or pieces, etc. that may be deposited and often at least partially, if not substantially fully, buried on the farm, construction site, landscape job, etc.

In general, this rock digging attachment 10 as shown in FIGS. 1–19 includes a base 14, a tine frame 16, a plurality of tines 18, an actuator 20, and a plurality of grapples forks 22. Base 14 is attachable to front end loaders or similar construction, landscaping, and farm machinery as is well known in the art. Tine frame 16 is rigidly affixed to the base 14 and partially houses the plurality of tines 18. Actuator 20 extends between the base 14 and the plurality of grapple forks 22 for pivoting the grapple forks from an open position as shown in FIGS. 1–5 to a closed position as shown in FIGS. 13–14.

More specifically, base 14 includes a face plate 30, a mount frame 32, and a connector plate 34. The face plate 30, mount frame 32 and connector plate 34 may be of any design, configuration, shape, etc. so as to provide a face for attachment to the front end loader and a rigid frame for supporting the tines 18 and grapples 22 as well as the actuator 20 for pivoting the grapples during rock grabbing.

In the embodiment shown, the face plate 30 is a rigid and thick plate that has a lip 36 around its entire periphery, the lip including a pair of opposing sides 36A and 36C, and a bottom 36B that all extend substantially perpendicularly from the plate 30, and a top 36D that obliquely extends from the plate 30 so as to define an acute angle 38 between the top 36D and the plate 30. The acute angled area 38 is so defined for receiving a portion of the attachment receiving plate on the front end loader. The face plate 30 also includes rigidity adding walls 40 extending between opposing sections of lip 36. The face plate 30 further includes a pair of slots 42 in bottom 36B for receiving locks on the attachment receiving plate of the front end loader such that after the base 14 is seated at its top onto the attachment plate then these locks may selectively engage these slots thereby locking the base 14 to the front end loader.

In the embodiment shown, the mount frame 32 is a rigid frame comprising several rigid metal bars 44 secured to one another and secured to the side of the face plate 30 opposing the side for receiving the front end loader. These rigid metal bars 44 include a plurality of upright bars 44A connected together by a pair of cross bars 44B. In the preferred embodiment, the mount frame 32 is angled in relation to the face plate 30 as is shown in FIGS. 1–5 and 8–9.

In the embodiment shown, the face plate 30 and the mount frame 32 are connected approximate the top edge of each. The connector plate 34 is a plate that connect the bottom edge of the face plate 30 and the mount frame 32.

Tine frame 16 is any rigid structure attachable to the mount frame for securely holding the plurality of tines 18 to the base 14 and, in the embodiment shown, allowing depth adjustment of the forks. In the embodiment shown, the tine frame 16 is a box-like structure 46 with a plurality of passages 48 therein for receiving the tines 18 and allowing for selective depth adjustment thereof (where the forks are otherwise secured in the fork frame). A fastener or other lock 50 such as a pin secures the forks within the fork frame but allows for such depth adjustment by removal of the fastener, movement of the fork within the passages, and reinsertion of the fastener to re-secure the fork within the fork frame. This lock 50 may either be insertable through the tine frame 16 where it securely holds the tines via one of the holes 58 in the tines, or insertable through one of these holes 58 and a separate securing bracket or other mechanism affixed to the tine frame. In other embodiments, the tines 18 may be affixed to the tine frame 16 in any manner including rigidly via a weld or other similar attachment concepts.

Tines 18 are each elongated rigid metal bars 52 with a pair of opposed ends 54 and 56, each of which is preferably tapered as shown in the Figures. In an adjustable tine embodiment, each tine 18 also includes a plurality of holes 58 for receiving the fastener 50 for securing the tine 18 within the tine frame 16.

In the embodiment shown in the Figures, the tines 18 are oriented within the fork frame 16 such that the tines are substantially vertical (when the mount frame 32 is vertical), although the tines are shiftable to a downwardly angled position (when the attachment 10 is shifted such that the face plate 30 is vertical) as is well known in the front end loader art. In other embodiments the tines may be oriented in a manner other than vertical; such other embodiments include orienting the tines to extend outward such as in a manner diagonal or horizontal with reference to the ground and/or the mount frame (the tine frame 16 may need to be extended down below the fork coupler 60, or the fork coupler 60 may need to be attached to the tine frame 16 at a higher location).

Actuator 20 is a hydraulic cylinder or the equivalent thereof for pivoting the plurality of grapple forks 22 from an open position as shown in FIGS. 1–11 to a closed position as shown in FIGS. 12–19. Actuator 20 is affixed to base 14 at one end and to a fork coupler 60 at the other end.

Forks 22 are each elongated rigid metal bars 62 with a pair of opposed ends 64 and 66 and an arcuate body 68 therebetween as shown in FIGS. 1–5 and 8–9. The distal or un-attached end 64 includes a curled or hooked end while the proximate end 66 is pivotally attached to the tine frame 16 and rigidly attached to the fork coupler 60. The bars 62 are connected by connectors 70.

In use, the rock digging attachment 10 is affixed to the front end loader 12 by sliding a top lip on the attachment receiving plate of the front end loader 12 under and into the acute angled area 38 as is well known in the art. The attachment receiving plate of the front end loader is then lifted at least slightly thereby allowing beginning to lift the attachment 10 resulting in the bottom 36B of the attachment 10 shifting toward the bottom of the attachment receiving plate of the front end loader 12 because the center of gravity on the attachment 10 is in front of acute angled area 38. Once the bottom 36B shifts into contact with the bottom of the attachment receiving plate of the front end loader 12, the locks on the front end loader 12 are then activated to engage the slots 42 in the bottom 36B resulting in a securing of the attachment plate 10 to the front end loader 12 as is well known in the art.

The rock digging attachment 10 may alternatively be attached to the front end loader 12 or any other construction, farming, landscaping, road maintenance or similar equipment in any manner sufficient to rigidly connect the attachment 10 thereto. It is contemplated that other attachment provisions will be necessary as various different attachment mechanism are used or are contemplated to be used to connect attachments to work equipment.

Figure 20:
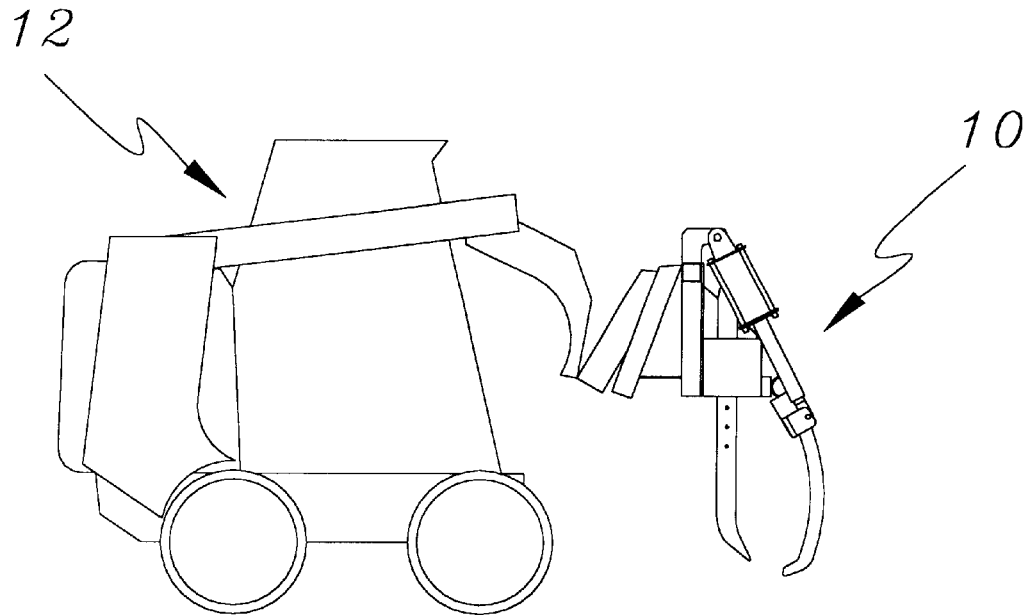
FIG. 20 is a side elevational view of the attachment of FIGS. 1–19 attached to a front end loader where the attachment is in an up and vertical position with the grapple forks in a closed position.
Figure 21:
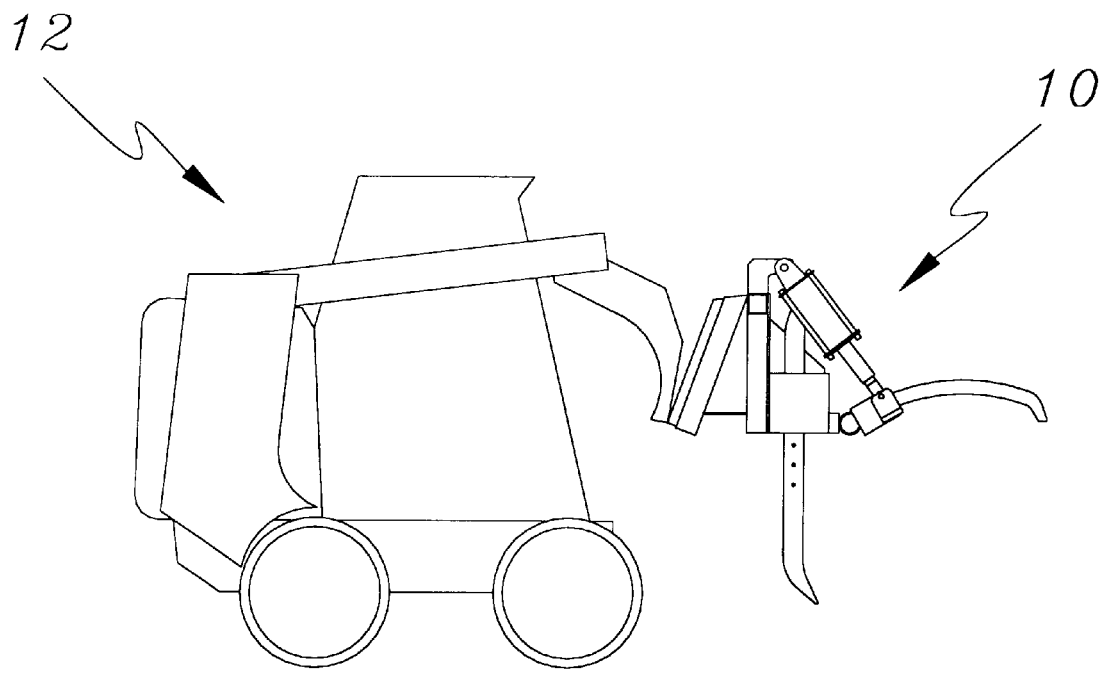
FIG. 21 is a side elevational view of the attachment of FIGS. 1–19 attached to a front end loader where the attachment is in an up and vertical position with the grapple forks in an open position.

If the grapple forks 22 are not in an up or open position, then the grapple forks 22 are typically actuated by actuator 20 from the down or closed position as shown in FIG. 20 to an up or open position as shown in FIG. 21. The rock digging attachment 10 is then ready for rock or other debris digging, dislodging, grabbing, lifting, moving, and/or positioning.

Figure 22:
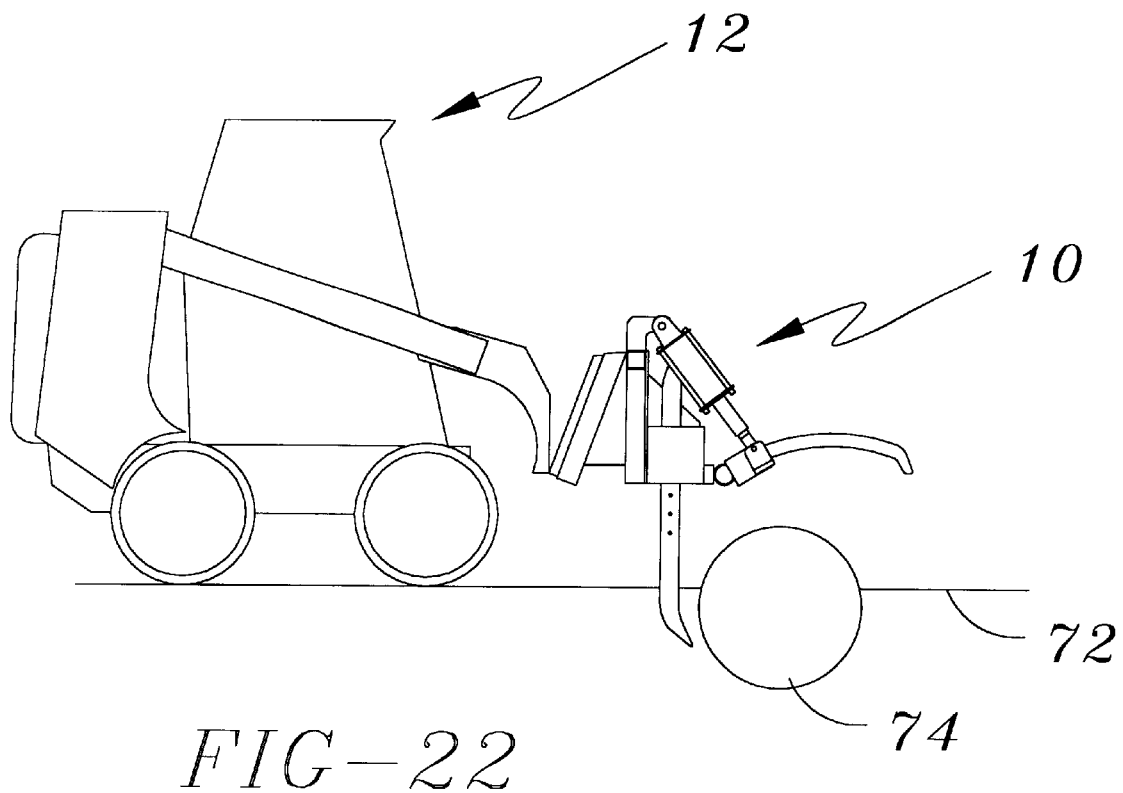
FIG. 22 is a side elevational view of the attachment of FIGS. 1–19 attached to a front end loader where the attachment is in a down (ground piercing) and vertical position with the grapple forks in an open and rock pre-grabbing position.
Figure 23:
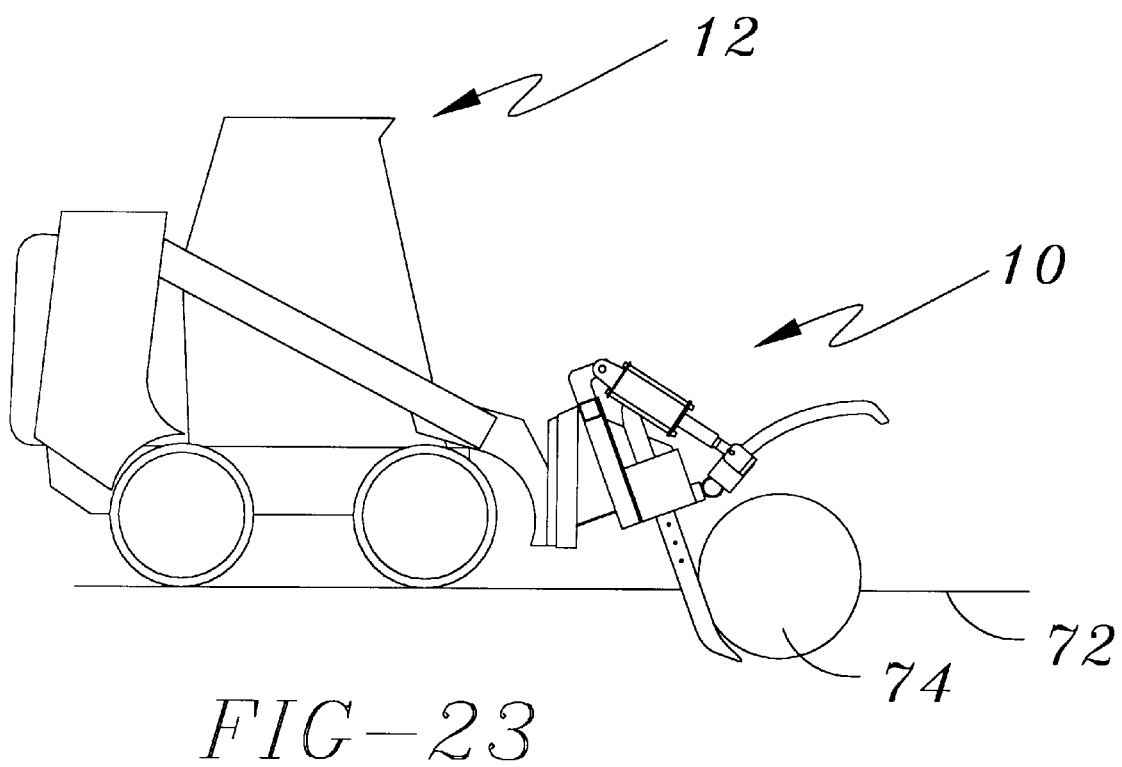
FIG. 23 is a side elevational view of the attachment of FIGS. 1–19 attached to a front end loader where the attachment is in a down (ground piercing) and downwardly angled position with the grapple forks in an open and rock pre-grabbing position.

When a rock or other debris is selected for removal from the ground, either resting on the ground or partially, if not substantially, buried, the tines 18 are thrust downward in front of the rock such that the tines pierce the ground 72 adjacent to the rock 74 as is shown in FIG. 22. Once the tines 18 are fully submerged in the ground adjacent the rock 74, the attachment 10 is pivoted so as to attempt to force the tines 18 under the rock 74 as is shown in FIG. 23. This pivoting of the attachment is performed by the front end loader 12 in a manner well known in the art of front end loaders.

This pivoting loosens the soil surrounding the rock. In addition, this pivoting forces the tines under the rock by forcing the rock upward and outward. This upward and outward movement of the rock may occur in one tine thrust and pivot, or may require multiple tine thrusts and pivots. If the rock 74 is dislodged, then the rock 74 may be grabbed and lifted as described below. If the rock 74 is not dislodged, then the tine thrust, ground piercing, and tine pivoting steps are repeated either in the same spot adjacent the rock or in another spot around the periphery of and adjacent the rock.

Figure 12:
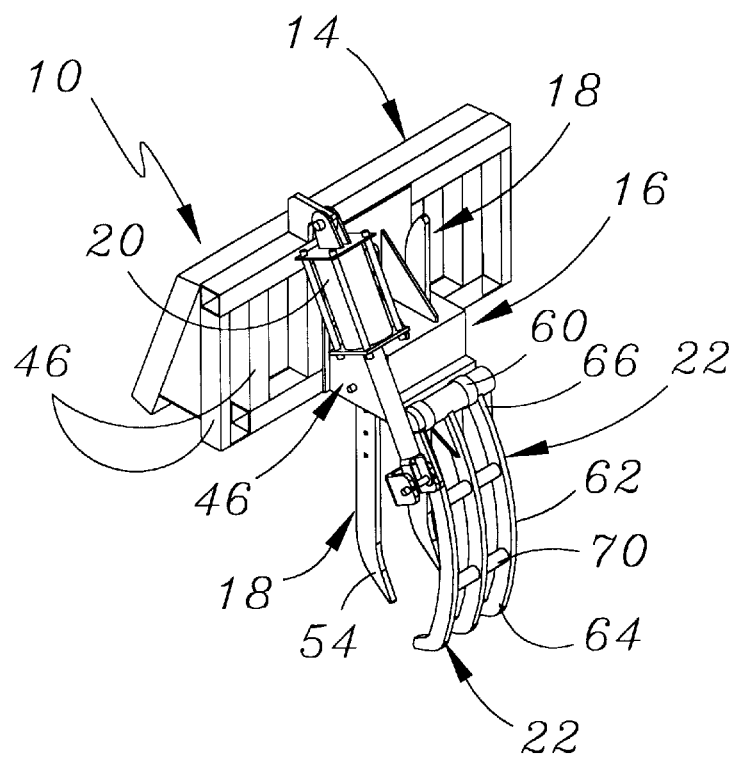
FIG. 12 is a general perspective view of the rock digging, dislodging, and lifting attachment of FIG. 1 shown from a front-left-top perspective with the grapple forks closed.
Figure 13:
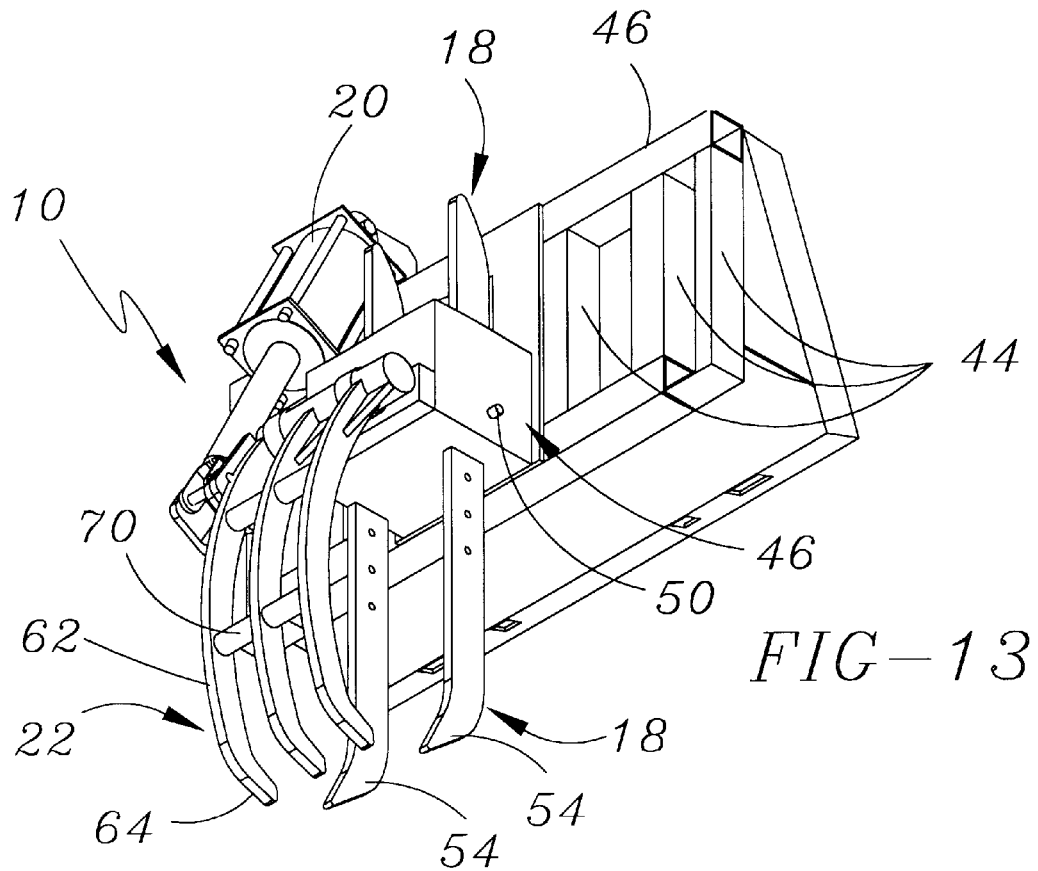
FIG. 13 is a general perspective view of the rock digging, dislodging, and lifting attachment of FIG. 12 shown from a front-right-bottom perspective with the grapple forks closed.
Figure 14:
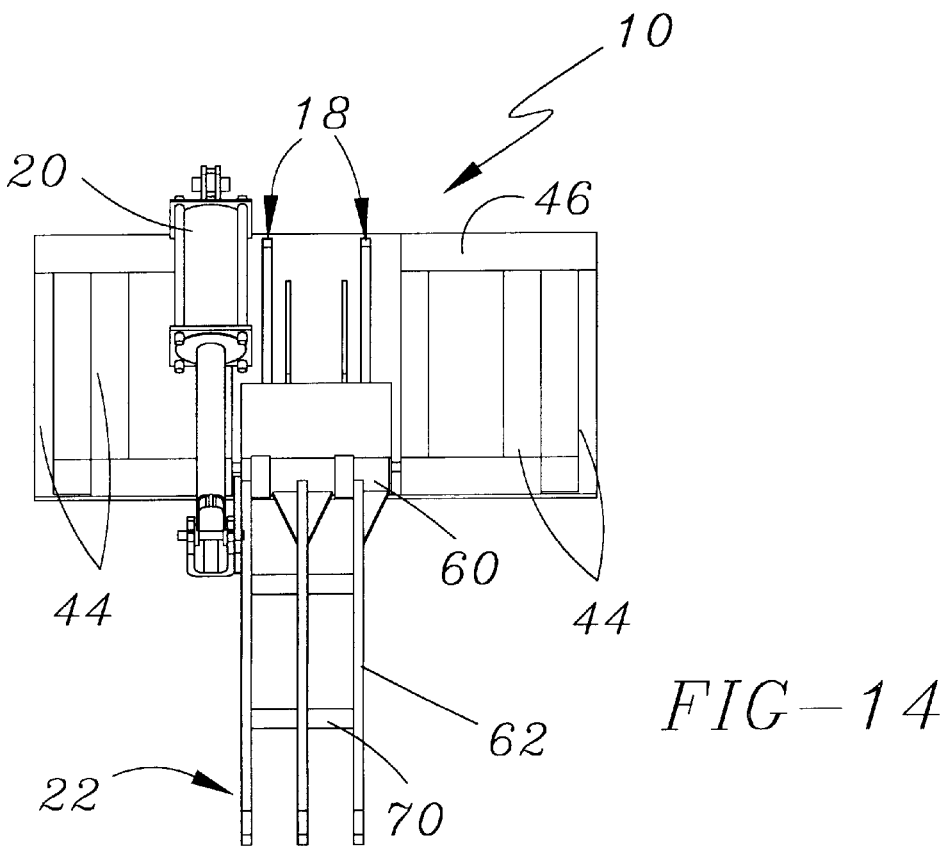
FIG. 14 is a front elevational view of the rock digging, dislodging, and lifting attachment of FIG. 12 with the grapple forks closed.
Figure 15:
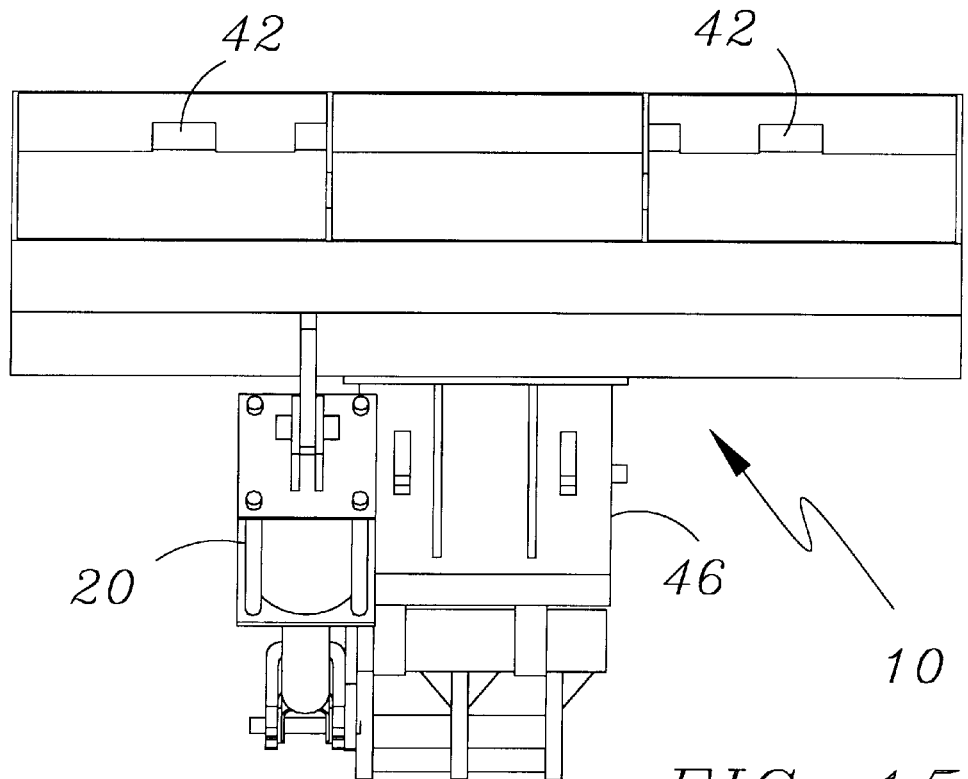
FIG. 15 is a top plan of the rock digging, dislodging, and lifting attachment of FIG. 12 with the grapple forks closed.
Figure 16:
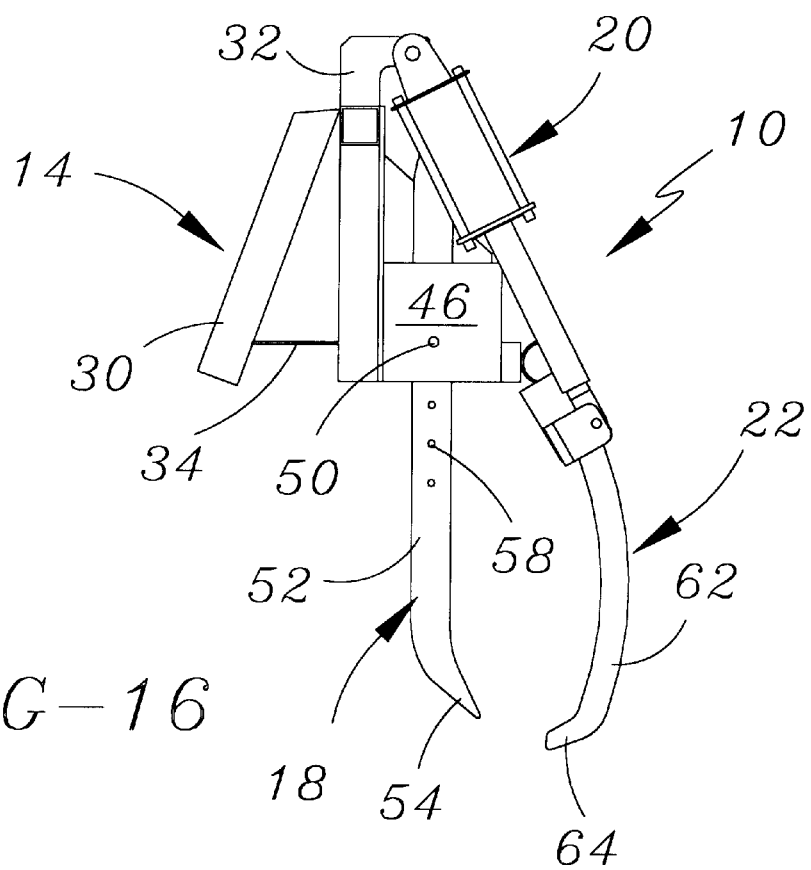
FIG. 16 is a left side elevational view of the rock digging, dislodging, and lifting attachment of FIG. 12 with the grapple forks closed.
Figure 17:
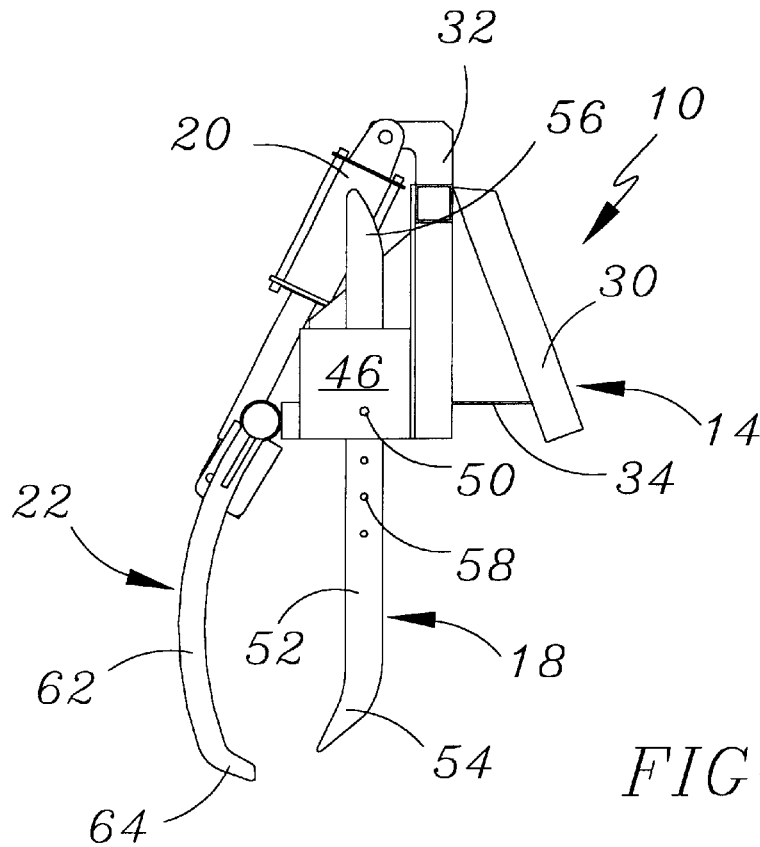
FIG. 17 is a right side elevational view of the rock digging, dislodging, and lifting attachment of FIG. 12 with the grapple forks closed.
Figure 18:
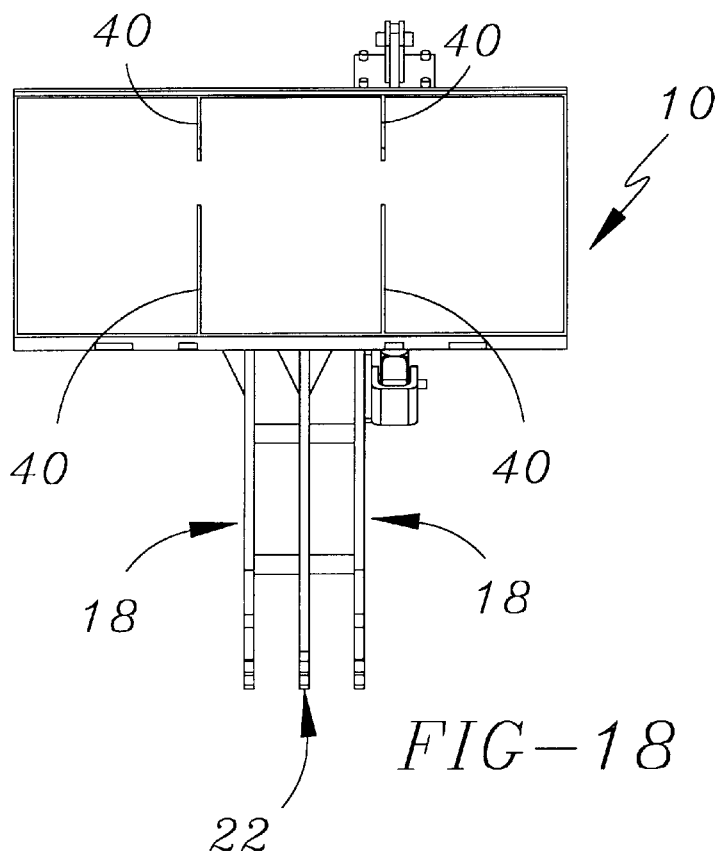
FIG. 18 is a back elevational view of the rock digging, dislodging, and lifting attachment of FIG. 12 with the grapple forks closed.
Figure 19:
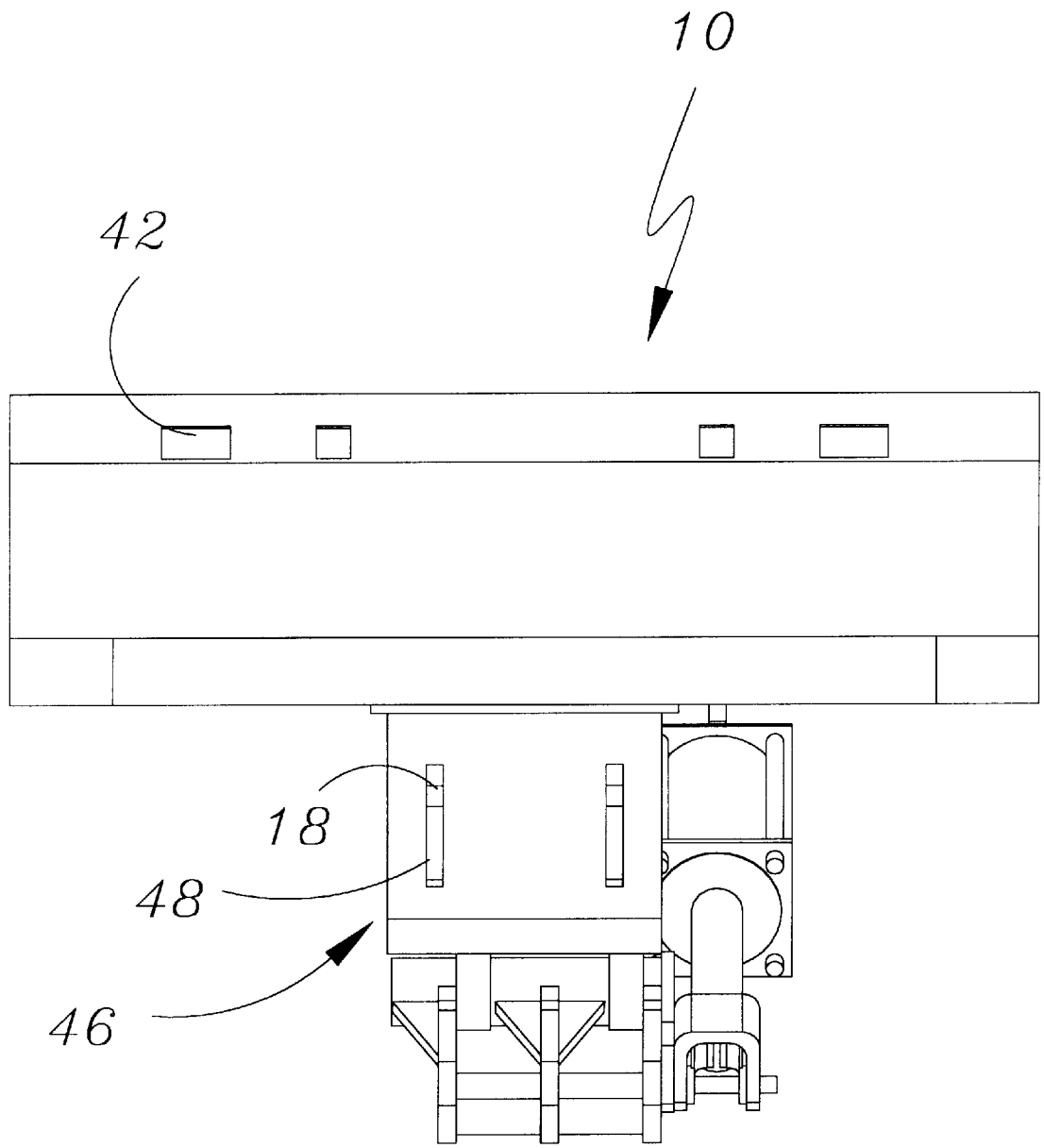
FIG. 19 is a bottom plan view of the rock digging, dislodging, and lifting attachment of FIG. 12 with the grapple forks closed.

Once the rock 74 is dislodged and preferably at least slightly pushed or lifted out of the hole 76 that it was buried within (although not necessary as the attachment 10 is capable of grabbing and lifting the rock from within the hole), the grapple forks 22 are actuated from the up or open position as shown in FIGS. 1–5 to a down or closed position, or at least as down or closed as possible position as shown in FIGS. 12–13, where the grapple forks 22 in combination with the tines 18 pin the rock therebetween and thus grab the rock 74 as is shown in FIG. 24.

The rock 74 is then lifted out of or off of the ground 72 and ready to be moved. This lifting is shown in FIG. 25 and performed by actuating the lifting of the attachment 10 by the front end loader as is well known in the art.

As is readily apparent, this attachment 10 has numerous other applications. For instance, old fences may be completely removed from the ground by grabbing the entire fence section between the tines 18 and forks 22 and lifting the fence section out of the ground. The attachment 10 is also useful for removing all of the horizontal wooden boards from the vertical fence posts by either dropping the tines and/or forks along the fence posts for ripping the boards from the posts, or alternatively raising the tines and/or forks along the fence posts for ripping the boards from the posts.

The attachment 10 is also useful for lifting large and heavy objects from the ground such as rocks, buckets, lumber, broken piece of asphalt or concrete, blocks, etc. In addition, the attachment 10 is further functional in lifting lumber, railroad ties, etc. Landscapers will find the attachment 10 particularly useful in the placing of rocks and boulders such as in landscaping walls as the attachment 10 provides for careful and accurate placement.

The attachment 10 may be of several varying designs including the vertical tine design, the horizontal tine design, or a diagonal tine design somewhere therebetween. In the vertical tine design as shown in the Figures. the tines are particularly useful for dislodging jobs as its downward and pivoting thrust capabilities are optimized in this design. In contrast, the horizontal tine design, which is the same as the vertical except the tines are oriented outward instead of downward, is particularly useful for lift and carry jobs as its outward tine position eliminates the need for the grapple forks to pin the load during carrying thereby reducing the stress on the device during carrying. However, it is important to realize that any of these designs is capable of performing all or substantially all of the tasks described above including the dislodging, lift and carry jobs.

It has been found that the number of tines and the number of forks is not critical and will vary depending upon the job at hand. The number of each may vary from as few as none or one, to as many as ten, eleven or twelve or more. It is expected that the more common arrangements will include two, four or six tines and three or five grapple forks; although certainly other numbers are contemplated.

In general, the attachment 10 serves to grab any large and heavy objects, and dislodge them if necessary. By providing this new attachment 10 to standard front end loaders 12 (or other skid steer loaders or similar farm, construction, or landscaping machinery), farmers, construction contractors, landscapers, road crews and any other person who desires to remove rocks, stumps, etc. from the surface of the ground or buried therein has an effective machine for doing so. As previously indicated, this rock removal process was previously performed using non-optimal equipment such as very large, hard to maneuver, and not optimally off-road accessible back hoes, or front end loaders with non-optimal attachments such as standard buckets, bale handlers, log handlers or grapple buckets which although optimally designed for their specific uses of dirt digging, hay and other material handling, log handling, etc. are not efficient at dislodging, digging, grabbing, lifting and moving rocks, stumps, etc.

We claim:

1. A front end loader attachment for performing at least one of the group of digging, dislodging, lifting and positioning of at least one of rocks and other debris, comprising:
   a substantially planar mount frame that is securable to a front end loader;
   a plurality of elongated forks attached to the mount frame;
   at least one elongated grapple pivotally attached to the mount frame; and
   an actuator extending between the mount plate and the at least one grapple for selectively pivoting the at least one elongated grapple between an open position separated apart from the plurality of elongated forks to a closed position where the at least one elongated grapple is proximate the plurality of elongated forks.

2. The attachment of claim 1 wherein the plurality of elongated forks are adjustably attached to the mount plate.

3. The attachment of claim 1 wherein the plurality of elongated forks are substantially parallel to the mount frame.

4. The attachment of claim 1 wherein the plurality of elongated forks are substantially perpendicular to the mount frame.

5. The attachment of claim 3 wherein the plurality of elongated forks are of a generally vertical nature.

6. The attachment of claim 4 wherein the plurality of elongated forks are of a generally horizontal nature.

7. The attachment of claim 1 wherein each of the elongated forks is a generally elongated straight tine with a curved outermost end, and wherein each of the elongated grapples is an elongated curved grapple fork with a sharply curved outermost end.

8. The attachment of claim 1 wherein the plurality of elongated forks are shaped and oriented to maximizing penetration when digging.

9. The attachment of claim 8 wherein each of the plurality of elongated forks has a rectangular cross section defined by a front surface, an opposite back surface, and a pair of opposing side surfaces that are therebetween, and whereby a depth measure defined as the distance between the front and back surfaces is greater than a width measure defined as the distance between the side surfaces thereby allowing for maximized penetration when digging with minimized earth displacement.

10. An attachment usable with at least one of the group of construction, farming, demolition, road maintenance and landscaping machine for performing at least one of digging, dislodging, grabbing, lifting, moving, and positioning of at least one of rocks, boulders, stumps, landscaping materials, small trees, poles, fence posts, fence sections, barrels, buckets, concrete slabs, asphalt slabs, pieces of slabs, other debris, comprising:

a substantially planar mount frame;

a plurality of elongated forks attached to the mount frame;

a plurality of elongated grapples connected together and pivotally attached to the mount frame; and an actuator extending between the mount frame and the elongated grapples for selectively pivoting the elongated grapples between an open position separated apart from the plurality of elongated forks to a closed position where the elongated grapples are proximate the plurality of elongated forks.

11. The attachment of claim 10 wherein the plurality of elongated forks are substantially parallel to the mount frame, and wherein the plurality of elongated forks are of a generally vertical nature.

12. The attachment of claim 11 wherein the plurality of elongated forks are adjustably attached to the mount frame.

13. The attachment of claim 10 wherein the plurality of elongated forks are substantially perpendicular to the mount frame.

14. The attachment of claim 13 wherein the plurality of elongated forks are of a generally horizontal nature.

15. The attachment of claim 10 wherein the plurality of elongated forks are one of the group of two, four or six tines, and wherein the plurality of elongated grapples are one of the group of three or five grapple forks.

16. The attachment of claim 10 wherein each of the plurality of elongated forks has a rectangular cross section defined by a front surface, an opposite back surface, and a pair of opposing side surface that are therebetween, and whereby a depth measure defined as the distance between the front and back surfaces is greater than a width measure defined as the distance between the side surfaces thereby allowing for maximized penetration when digging with minimized earth displacement.

17. A method of performing at least one of digging, dislodging, grabbing, lifting, moving, and positioning of at least one of rocks, boulders, stumps, landscaping materials, small trees, poles, fence posts, fence sections, barrels, buckets, concrete slabs asphalt slabs, pieces of slabs, and other debris, comprising:

thrusting a plurality of elongated forks in either a downward or outward direction where the plurality of elongated forks are affixed on an attachment that is usable with one of construction, farming, demolition, road maintenance and landscaping machine;

pivoting the attachment with the plurality of elongated forks thereon so as to bring the elongated forks into contact with at least one of a backside of the rocks, boulders, stumps, landscaping materials, small trees, poles, fence posts, fence sections, barrels, buckets, concrete slabs, asphalt slabs, pieces of slabs, and other debris that is to be at least one of dislodged, grabbed, lifted, moved, and positioned;

moving a plurality of elongated grapples into contact with an opposing side of at least one of the rocks, boulders, stumps, landscaping materials, small trees, poles, fence posts, fence sections, barrels, buckets, concrete slabs, asphalt slabs,pieces of slab, and other debris that is to be at least one of dislodged, grabbed, lifted, moved, and positioned so as to pin at least one of rocks, boulders, stumps, landscaping materials, small trees, poles, fence posts, fence sections, barrels, buckets, concrete slabs, asphalt slabs, pieces of slab, and other debris therebetween; and lifting the attachment.

18. The method of claim 17 further comprising the step of carrying the at least one of rocks, boulders, stumps, landscaping materials, small trees, poles, fence posts, fence sections, barrels, buckets, concrete slabs, asphalt slabs, pieces of slabs, and other debris that has been lifted to an appropriate position.

19. The method of claim 17 wherein the thrusting step involves piercing the ground and rooting underneath of the at least one buried rocks, boulders, stumps, landscaping materials, small trees, poles, fence posts, fence sections, barrels, buckets, concrete slabs asphalt slabs, pieces of slabs, and other debris that is to be dislodged, grabbed, lifted, moved, and positioned.

20. The method of claim 17 wherein the thrusting and pivoting step is repeated to dislodge the at least one of rocks, boulders, stumps, landscaping materials, small trees, poles, fence posts, fence sections, barrels, buckets, concrete slabs, asphalt slabs, pieces of slabs, and other debris.

* * * * *